M. A. JACKSON & J. A. BRISTOW.
HARROW ATTACHMENT.
APPLICATION FILED MAY 15, 1909.
934,313.
Patented Sept. 14, 1909.
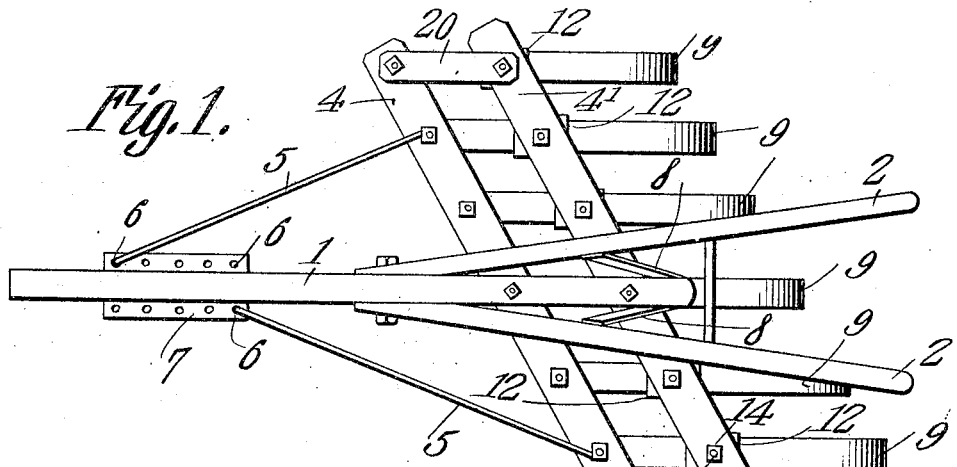
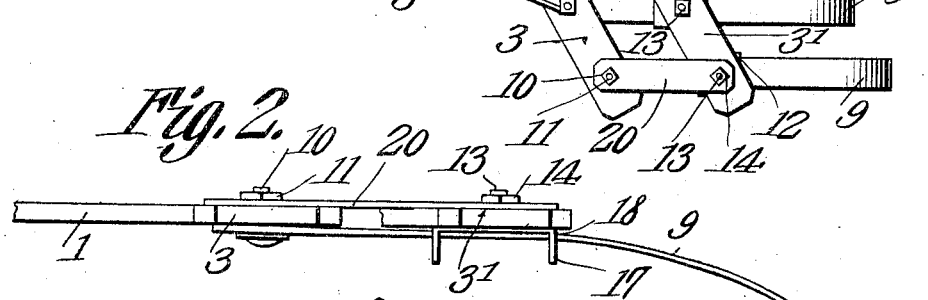
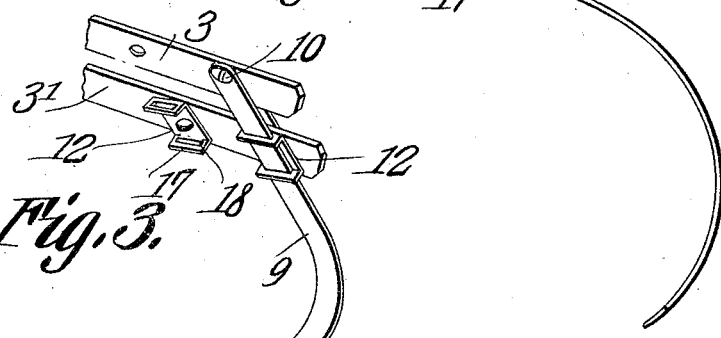
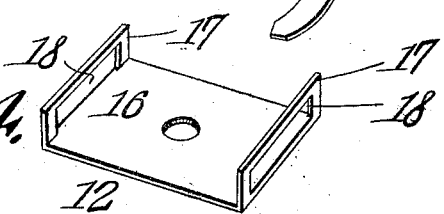

UNITED STATES PATENT OFFICE.

MERRIOTT A. JACKSON AND JOHN A. BRISTOW, OF ATHENS, TEXAS.

HARROW ATTACHMENT.

934,313.

Specification of Letters Patent. Patented Sept. 14, 1909.

Application filed May 15, 1909. Serial No. 496,155.

*To all whom it may concern:*

Be it known that we, MERRIOTT A. JACKSON and JOHN A. BRISTOW, citizens of the United States, residing at Athens, in the county of Henderson, State of Texas, have invented a new and useful Harrow Attachment, of which the following is a specification.

Our invention relates to attachments for supporting the teeth of harrows and particularly for supporting the teeth of the class of harrows commonly termed spring-toothed harrows, and it has for its object to provide a support that will contribute materially to the strength and consequent durability of this class of harrows.

In the drawings,—Figure 1 is a top view of a spring-toothed harrow equipped with our invention. Fig. 2 is a side elevation of a harrow tooth fitted with the tooth-holding attachment shown in Fig. 4. Fig. 3 is a perspective view in detail showing the holder mounted on a harrow with and without the tooth in position. Fig. 4 is a perspective view of the harrow tooth holder.

Like numerals of reference represent like parts in both drawing and description.

The spring tooth type of harrow shown in Fig. 1 embraces a beam 1, vertically adjustable handles 2, parallel supporting bars 3—3′ and 4—4′ on the two sides of the beam 1 angularly adjustable with the beam 1 by means of the rods 5—5 and the perforations in the plate 7 bolted to the under side of the beam 1, handle braces 8, teeth 9, bolts 10 and nuts 11 securing the teeth 9 and holding plates 12 secured by the bolts 13 and nuts 14. The tooth holding plates 12 and the method of mounting them with relation to the supporting bars 3′—4′ and the teeth 9 being the same for all, a description of one will suffice.

The plate 12 comprises a middle flat portion 16, perforated suitably to engage rotatably the side of the bolt 13, and end members 17 bent perpendicularly to a face of the middle portion 16 perforated with slots 18 registering with each other suitably to receive and engage slidably the horizontal portion or shank of the tooth 9 and support it from the point of engagement to and including its operative extremity when the latter is raised from the ground.

The plate 12 is rotatably secured to the under side of the adjustable supporting bar 3′ by means of the bolt 13 and the nut 14. The extremity of the straight portion or shank of the tooth is passed through the slots 18 and carried forward to the front supporting bar 3 where it is secured for lateral pivotal movement by the bolt 10 and the nut 11.

Connecting bars 20 of equal dimensions are pivotally secured one on each side of the harrow to the upper surface of the outer extremities of the adjustable supporting arms 3—3′ and 4—4′ by means of the vertical bolts 10 and 13. The function of the connecting bars 20 is to communicate the adjusting movements from the bars 3 and 4 to the bars 3′ and 4′ and secure simultaneous parallel adjustment of the teeth 9 on both sides of the beam 1.

The holding plate pivoted as it is to the rear adjustable bar secures as free movement to the harrow tooth as if the harrow tooth itself were pivoted at that point. In this manner the full strength of the harrow tooth is preserved without weakening it by a pivot bolt.

Having described our invention what we claim is:—

1. In a spring-tooth harrow, a harrow tooth holder including a plate, means of suspending said plate in oscillatory engagement with a supporting member of the harrow, means of slidably engaging the shank of said tooth, and means of supporting an extremity of the tooth.

2. In a spring-tooth harrow, a harrow tooth holder embracing a plate adapted to engage for oscillatory movement the head and adjacent side portions of a bolt carried by a supporting member of the harrow, means of slidably engaging the shank of a tooth, and means of supporting an extremity of the tooth.

3. In a spring-tooth harrow, a harrow tooth holder embracing a plate, means of suspending said plate in oscillatory engagement with a supporting member of a harrow, parallel members of said plate provided with slots adapted to slidably engage the shank of the tooth, and means of supporting an extremity of the tooth.

4. In a spring-tooth harrow, a harrow tooth holder embracing a plate, means of suspending said plate in oscillatory engagement with a supporting member of a harrow, a means of slidably engaging the shank of a tooth and parallel members provided with slots adapted to support the operative extremity and adjacent portion of the tooth.

5. In a spring-tooth harrow, the combination of a harrow tooth holder embracing a plate provided with a central perforation, parallel members provided with registering slots, a bolt engaging said perforation, a harrow tooth engaging said slots, the said harrow tooth provided with a perforation in the extremity of its shank, and a pivot bolt engaging said perforation in the said shank and the front adjusting arm of the harrow.

6. In a spring-tooth harrow, the combination of a harrow tooth holder including a plate provided with a central perforation, parallel members perpendicular to a face of said plate and provided with registering slots, the shank of a harrow tooth engaging said slots, the said shank of the said harrow tooth being provided with a perforation adapted to engage a pivot, a connecting bar provided with a perforation at its opposite extremities adapted to receive pivots; a pivot engaging the perforation and a portion of an adjacent surface of one side of the plate, a perforation in the rear supporting bar and the perforation at one extremity of the connecting bar, and a pivot engaging a perforation in the shank of the said harrow tooth, a perforation in the forward adjustable supporting bar, and a perforation in the other extremity of said connecting bar.

In testimony that we claim the foregoing as our own, we have hereto affixed our signatures in the presence of two witnesses.

MERRIOTT A. JACKSON.
JOHN A. BRISTOW.

Witnesses:
ROYAL R. WATKINS,
EARL JONES.